United States Patent
Sun et al.

(10) Patent No.: US 10,109,322 B1
(45) Date of Patent: Oct. 23, 2018

(54) ANTI-SHOCK SYSTEM FOR A DATA STORAGE DEVICE

(71) Applicant: Seagate Technology LLC, Cupertino, CA (US)

(72) Inventors: Hao Sun, Singapore (SG); Aravind Pitty, Singapore (SG); Xiong Liu, Singapore (SG)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/620,146

(22) Filed: Jun. 12, 2017

(51) Int. Cl.
*G11B 33/08* (2006.01)
*G11B 5/10* (2006.01)
*G11B 33/02* (2006.01)
*G11B 19/04* (2006.01)

(52) U.S. Cl.
CPC ............. *G11B 33/08* (2013.01); *G11B 5/102* (2013.01); *G11B 19/042* (2013.01); *G11B 33/027* (2013.01)

(58) Field of Classification Search
None
See application file for complete search history.

(56) References Cited

U.S. PATENT DOCUMENTS

| | | | |
|---|---|---|---|
| 5,235,472 A * | 8/1993 | Smith ................. | G01P 15/0922 360/60 |
| 5,452,612 A | 9/1995 | Smith et al. | |
| 6,098,460 A | 8/2000 | Otsuchi et al. | |
| 6,109,101 A * | 8/2000 | Iwabuchi ............... | G11B 19/00 360/99.08 |
| 6,615,465 B2 | 9/2003 | Otsuchi et al. | |
| 6,629,462 B2 | 10/2003 | Otsuchi et al. | |
| 6,909,571 B2 * | 6/2005 | Boljanovic .......... | G11B 5/4853 360/75 |
| 7,256,968 B1 | 8/2007 | Krinke | |
| 7,375,930 B2 | 5/2008 | Yang et al. | |
| 7,453,660 B2 | 11/2008 | Tanner | |
| 7,483,238 B2 | 1/2009 | Xu et al. | |
| 7,835,110 B2 | 11/2010 | Johnston et al. | |
| 7,839,604 B1 | 11/2010 | Coffey et al. | |
| 8,681,440 B1 * | 3/2014 | Theimer ............... | G11L 35/012 360/39 |
| 8,976,472 B1 * | 3/2015 | Theimer ............... | G11L 35/012 360/39 |
| 9,202,510 B2 * | 12/2015 | Theimer ............... | G11L 35/012 |
| 9,202,512 B2 | 12/2015 | Bi et al. | |
| 9,330,694 B1 | 5/2016 | Hahn et al. | |

(Continued)

FOREIGN PATENT DOCUMENTS

JP 63241774 A * 10/1988
JP 01107382 A * 4/1989

(Continued)

*Primary Examiner* — William J Klimowicz
(74) *Attorney, Agent, or Firm* — Westman, Champlin & Koehler, P.A.

(57) ABSTRACT

A data storage device that includes a housing and at least one data storage medium within the housing. The data storage device further includes an anti-shock system having at least one piezoelectric layer on a portion of the housing and at least one element electrically coupled to the at least one piezoelectric layer. The at least one element provides a deflection control signal to the at least one piezoelectric layer.

20 Claims, 9 Drawing Sheets

(56) References Cited

U.S. PATENT DOCUMENTS

| | | | |
|---|---|---|---|
| 9,564,162 B1 | 2/2017 | Byoun et al. | |
| 2010/0328230 A1* | 12/2010 | Faubert | G06F 1/1626 |
| | | | 345/173 |
| 2016/0275984 A1* | 9/2016 | Arisaka | G11B 19/2018 |
| 2017/0309312 A1* | 10/2017 | Daugela | G11B 33/10 |

FOREIGN PATENT DOCUMENTS

| | | | | | |
|---|---|---|---|---|---|
| JP | 04344381 | A | * | 11/1992 | |
| JP | 04364280 | A | * | 12/1992 | |
| JP | 10149645 | A | * | 6/1998 | |
| JP | 2000241442 | A | * | 9/2000 | |
| JP | 2003228956 | A | * | 8/2003 | |
| JP | 2005302246 | A | * | 10/2005 | G11B 33/08 |
| KR | 20030006849 | A | * | 1/2003 | |

\* cited by examiner

ANTI-SHOCK SYSTEM FOR A DATA STORAGE DEVICE

BACKGROUND

Data storage devices such as disc drives are commonly used in work stations, personal computers, portable computers and other computing systems to store large amounts of data in a form that can be readily available to a user. A disc drive includes a head disc assembly that is coupled to a printed circuit board assembly. The head disc assembly includes a variety of components. The components include one or more discs having data storage surfaces. The disc(s) are mounted on a spindle motor that causes the disc(s) to spin and the data storage surfaces of the disc(s) to pass under respective disc head sliders. The sliders carry transducers, which write information to and read information from the data surfaces of the discs.

With the rapid increase in areal density of data storage media, continued demand exists for disc drives having a small size suitable for use in handheld or portable devices, such as communication devices (e.g. cell phones), audio devices (e.g. digital music players), computing machines (e.g. personal data assistants), video recorders (e.g. digital cameras) and other small consumer applications. Small sized disc drives for use with these types of consumer products should be capable of withstanding accidental drops and high operating shock and vibration levels. Other devices such as hybrid drives and solid state drives may need similar shock-withstanding capabilities.

SUMMARY

The present disclosure relates to an anti-shock system for a data storage device.

In one embodiment, a data storage device is provided. The data storage device includes a housing and at least one data storage medium within the housing. The data storage device further includes an anti-shock system having at least one piezoelectric layer on a portion of the housing and at least one element electrically coupled to the at least one piezoelectric layer. The at least one element is configured to provide a deflection control signal to the at least one piezoelectric layer.

This summary is not intended to describe each disclosed embodiment or every implementation of the anti-shock system. Many other novel advantages, features, and relationships will become apparent as this description proceeds. The figures and the description that follow more particularly exemplify illustrative embodiments.

DETAILED DESCRIPTION

Embodiments of the disclosure are generally directed to anti-shock systems for data storage devices. However, prior to providing additional details regarding the different embodiments, a description of an illustrative operating environment is provided below.

Figure 1A:
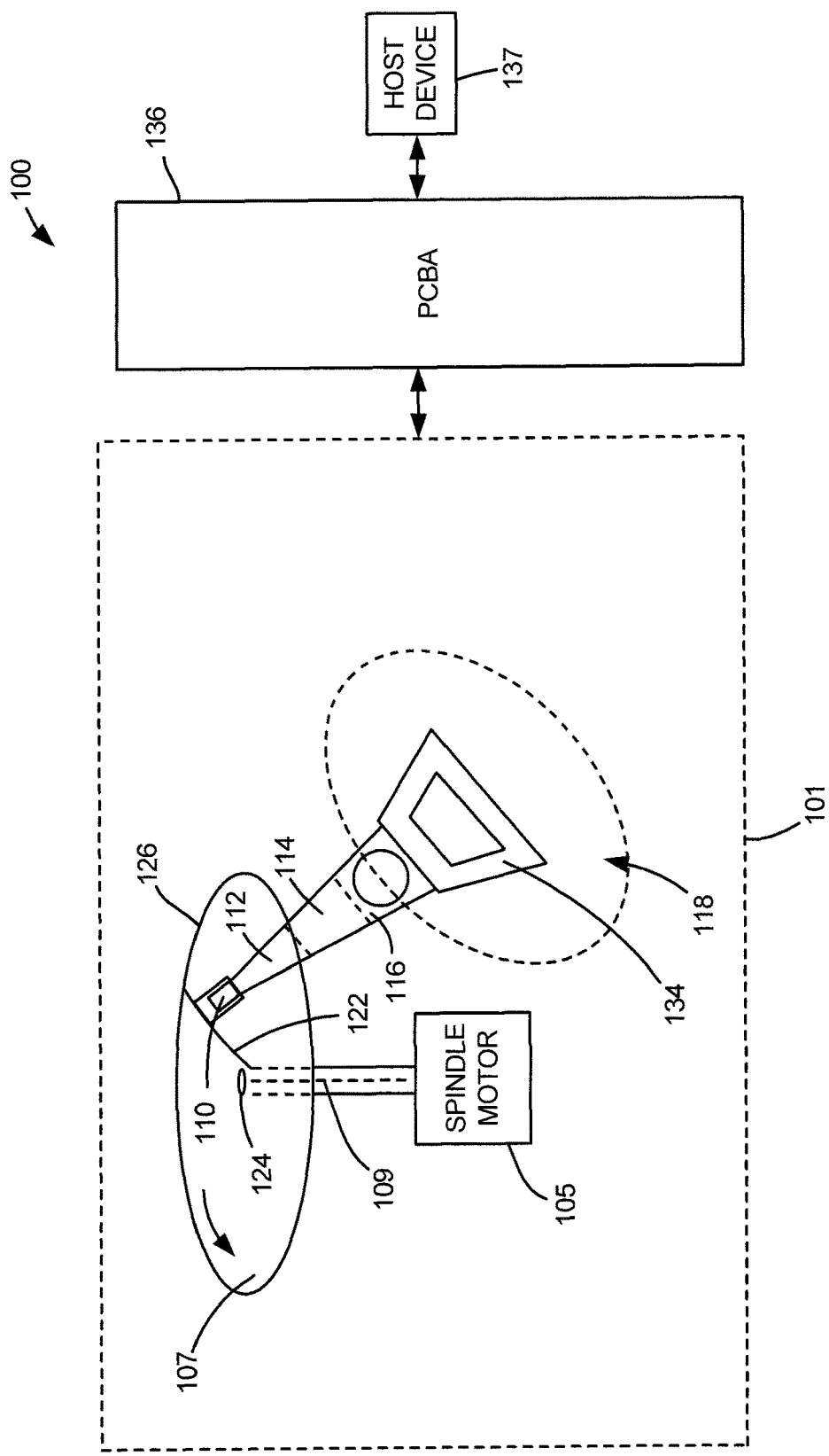
FIG. 1A is a block diagram of a data storage device in which an anti-shock system as disclosed herein may be incorporated.

FIG. 1A shows an illustrative operating environment in which an anti-shock system as disclosed herein may be incorporated. The operating environment shown in FIG. 1A is for illustration purposes only. Embodiments of the present disclosure are not limited to any particular operating environment such as the operating environment shown in FIG. 1A. Embodiments of the present disclosure are illustratively practiced within any number of different types of operating environments.

It should be noted that like reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments, in which the elements are indirectly connected, coupled or attached to each other.

FIG. 1A is a simplified schematic diagram of a disc drive 100 in which an anti-shock system is useful. Disc drive 100 includes a hermetically sealed enclosure 101 also referred to as a head disc assembly (HDA). In general, although not illustrated in FIG. 1A, enclosure or HDA 101 is defined by a base, a top cover and sidewalls. Enclosure or HDA 101 includes a disc 107. Those skilled in the art should recognize that disc drive 100 can include a single disc, as illustrated in FIG. 1A, or multiple discs included in a disc pack. Disc 107 is mounted on a spindle motor 105 for rotation about a central axis 109. Each disc surface has an associated slider 110. Each slider 110 carries a read/write head for communication with the surface on the disc.

Each slider 110 is supported by a suspension 112 which is in turn attached to a track accessing arm 114 of an actuator mechanism 116. Actuator mechanism 116 is rotated about a shaft by a voice coil 134 of a voice coil motor 118. As voice coil motor 118 rotates actuator mechanism 116, slider 110 moves in an arcuate path 122 between a disc inner diameter 124 and a disc outer diameter 126. While FIG. 1A illustrates one manner of actuating a data head proximate a data storage medium, the present invention, however, is applicable to data storage systems that use other techniques.

Disc drive 100 also includes a printed circuit board assembly (PCBA) 136. PCBA 136 may be located outside enclosure or HDA 101. In some embodiments, PCBA 136 is mounted to an outer surface of enclosure or HDA 101. PCBA 136 supports a plurality of circuit components (not shown in FIG. 1). The circuit components are configured to couple to components enclosed within enclosure or HDA 101, such as spindle motor 105, slider 110, actuator mechanism 116 and voice coil motor 118, and configured to communicate with a host device 137. Additionally, some of the circuit components may be a part of an anti-shock system of disc drive 100 and may be coupled to other anti-shock system components (not shown in FIG. 1A) that are included on a housing of disc drive 100. An example of a disc drive housing is described below in connection with FIG. 1B.

Figure 1B:
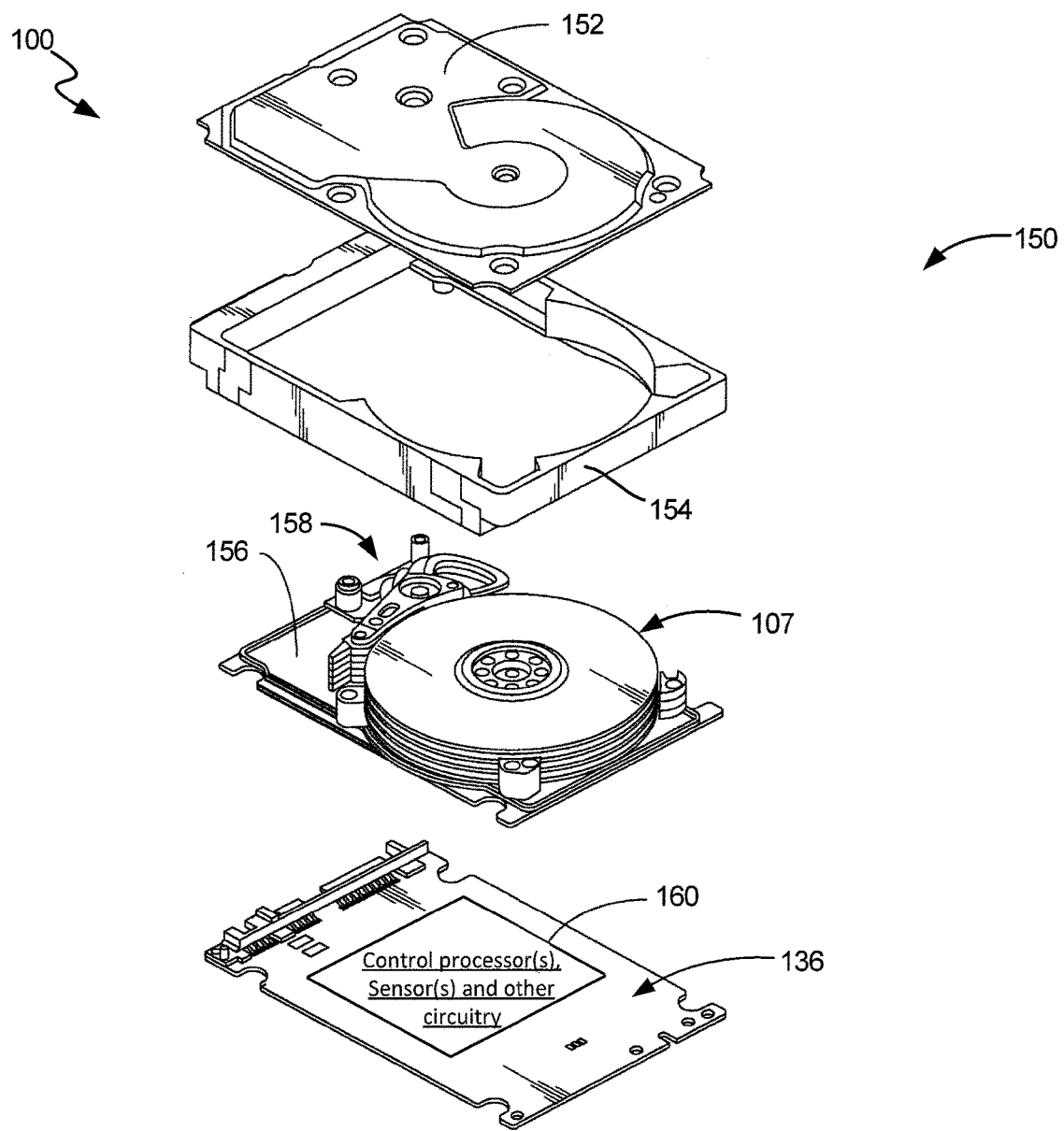
FIG. 1B is an exploded view of a data storage device of the type shown in FIG. 1A.

FIG. 1B provides an exploded view of disc drive 100 with an example casing or housing 150. As shown, the housing 150 includes a top cover 152, a base-deck frame 154 and a base-deck floor or baseplate 156. In the embodiment shown in FIG. 1B, base-deck frame 154 and base-deck floor 156 are two separate pieces. However, in other embodiments, base-deck frame 154 and base-deck floor 156 may be a single piece. In such embodiments, the single piece is referred to herein as a base. The housing 150, including the base-deck frame 154, base-deck floor 156 and the top cover 152, may adhere to any of a number of different form factors, including, for example, the 2.5" and 3.5" form factors for disc drives. As indicated above in connection with FIG. 1A, the housing 150, in combination with disc drive internals 158 and PCBA 136 provide the disc drive 100. As indicated above, PCBA 136 may include circuit components (denoted by reference numeral 160 in FIG. 1B) that couple to disc drive internals 158. Further, at least some of circuit components 160 may be employed to carry out shock protection functions in disc drive 100.

As noted earlier, it is important for a data storage device (e.g., a disc drive such as 100) included, for example, in a mobile device to perform well during shock events. As indicated above, as mobile devices become thinner, the data storage devices (e.g., disc drives such as 100) employed within the mobile devices also become thinner. There is a trade-off in individual component thickness with respect to stiffness or deflection. During shock events, thinner components deflect more, and larger deflections may cause contact between components, which is typically undesirable.

During a shock event, a shock pulse may travel through a baseplate such as 156 to a data storage medium or data storage media such as disc(s) 107. A thinner baseplate 156 may amplify a deflection of disc 107 more. This amplification of the deflection of disc 107 is determined by stiffness and damping of the disc drive 100. In disc drive 100, stiffness may be a greater contributor to the amplification of the deflection of disc 107 during shock than damping. Components of the disc drive 100 such as disc 107, spindle motor 105, actuator mechanism 116, voice coil 134, voice coil motor 118, accessing arm 114, etc., may be considered as a mass during the shock event. The stiffness of the disc drive 100 is mainly provided by the base (e.g., elements 154 and 156) and the cover 152.

A material, thickness and geometric shape of cover 152 and base 154 and 156 determine the stiffness of the elements 152, 154 and 156. However, as indicated earlier, the demand for thinner form factor storage devices places both thickness and design limitations. In other words, there is limited space to increase thickness or make changes in geometric shape. A few combinations of materials and geometric shapes have been utilized for base 154 and 156 and cover 152 to address the above-noted problems with shock. However, current techniques have achieved limited improvement in terms of shock amplification, and have failed to address the root cause of the problem. Embodiments of disc drive anti-shock systems that provide improvements over current shock protection systems are provided below in connection with FIGS. 2A-4C.

Figure 2A:
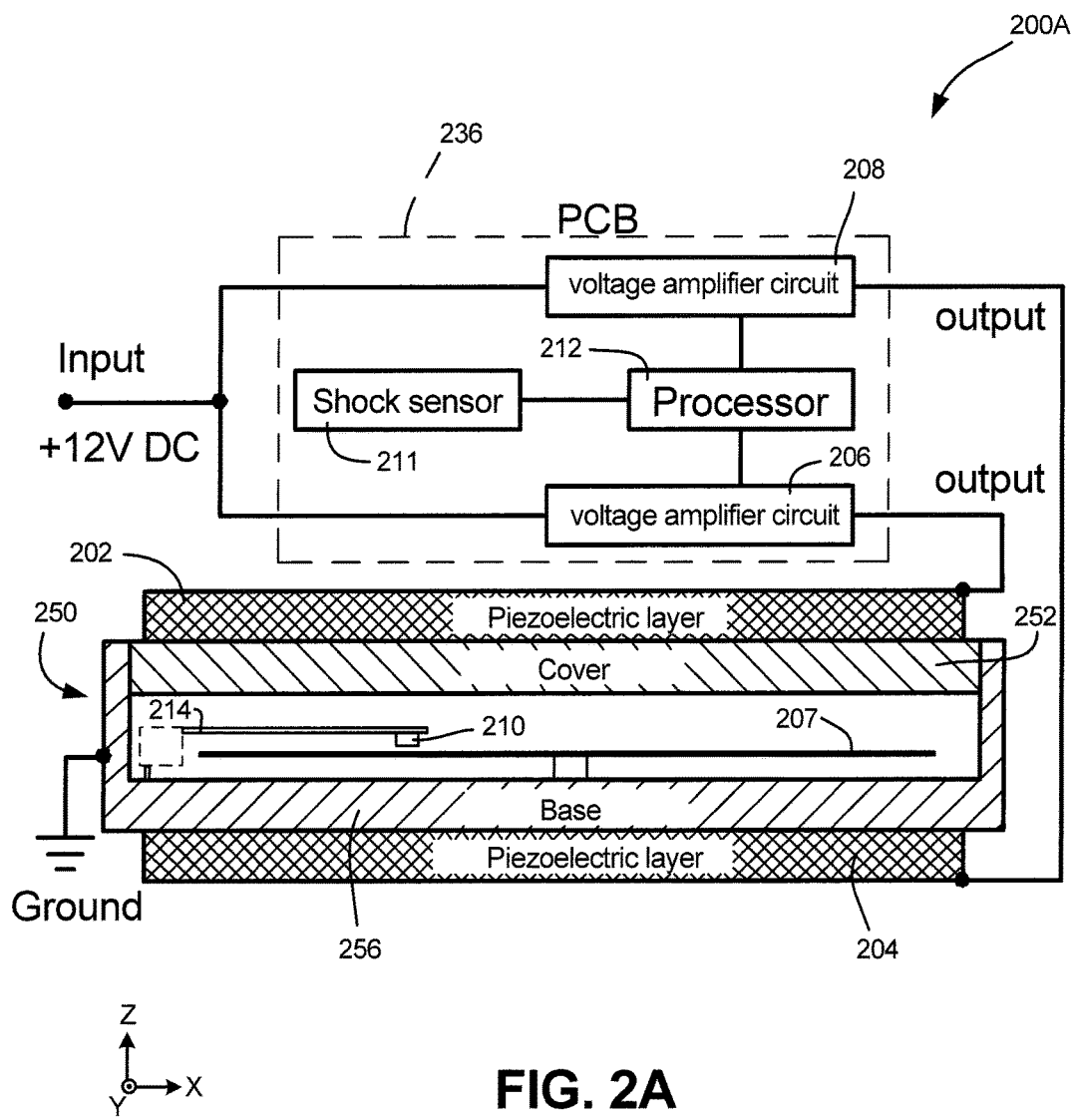
FIG. 2A is a diagrammatic illustration of a data storage device in accordance with one embodiment.

FIG. 2A is a diagrammatic illustration of a data storage device 200A that includes an anti-shock system in accordance with one embodiment. In the embodiment of FIG. 2A, the anti-shock system includes a shock sensor 211, a processor 212, first and second piezoelectric material layers 202 and 204 and their corresponding voltage amplifier circuits 206 and 208. It should be noted that, in some embodiments, only one piezoelectric layer and one corresponding voltage amplifier circuit may be employed in the anti-shock system. In certain other embodiments, more than two piezoelectric layer with corresponding voltage amplifier circuits may be employed. It should also be noted that, in some embodiments, processor 212 may be a disc drive controller the carries out numerous data storage/retrieval-related functions in addition to providing certain functions of the anti-shock system. Also, an output of shock sensor 211 may be utilized by processor or controller 212 to carry out other control functions (e.g., head position control functions under vibration) independently of the anti-shock functions. Thus, in some embodiments, existing functionality of shock sensor 211 and controller 212 is leveraged and expanded to carry out the anti-shock system functions.

As can be seen in FIG. 2A, shock sensor 211 and processor 212 are located on printed circuit board 236. Voltage amplifier circuits 206 and 208 are also included on the printed circuit board 236 and coupled to the processor 212 on the printed circuit board 236 by any suitable connection techniques (e.g., by traces on printed circuit board 236.)

Unlike other anti-shock materials such as rubber that operate in a single mode (e.g. a passive mode), piezoelectric material can operate in both active and passive modes. Further, actuators formed of piezoelectric material can generate larger forces and provide higher response speeds than actuators made of materials such as rubber. Also, a piezoelectric layer such as 202, 204 can be manufactured with a very thin dimension to meet space constraints within a data storage drive such as 200A.

In different embodiments, the piezoelectric material layer(s) may be bonded/affixed on inner or outer surfaces of the cover and the base. Moreover, the piezoelectric material layer(s) may be bonded on other components of the data storage drive, such as an arm to which a read/write head is coupled. A location and shape of a piezoelectric layer within a data storage drive may depend on availability of space, so as to not violate any form factor specifications. In the embodiment of FIG. 2A, the first piezoelectric layer 202 is bonded to an outer surface of the cover 252, and the second piezoelectric layer 204 is bonded to an outer surface of the base 256. As can be seen in FIG. 2A, surfaces of piezoelectric layers 202 and 204 that are in contact with cover 252 and the base 256, respectively, are grounded. A surface of each piezoelectric layer 202, 204 that is not in contact with housing 250 (e.g., not in contact with cover 252 or base 256) is electrically coupled to a respective voltage amplifier circuit 206, 208. Each voltage amplifier circuit 206, 208 may include power amplifiers connected in a bridge mode to provide a high voltage mono amplifier, which is used as a driver for the piezoelectric layer 202, 204. Each voltage amplifier 206, 208 is connected separately to a corresponding piezoelectric layer 202, 204. A same input voltage may be provided to each voltage amplifier circuit 206, 208. In the embodiment of FIG. 2A, each voltage amplifier circuit 206, 208 is shown as receiving a +12 Volt (V) direct current (DC) and, as indicated above, the output of each voltage amplifier circuit 206, 208 is a control voltage source (or deflection control signal) for the respective piezoelectric layer 202, 204. In alternate embodiments, any suitable input voltage other than +12V DC may be employed. Also, in certain embodiments, each voltage amplifier circuit 206, 208 may employ a different input voltage level.

During shock, the shock sensor 211 initially senses the shock and provides a voltage output, which is sent to the processor 212. In one embodiment, shock sensor 211 may be formed of piezoelectric material. Such a shock sensor 211 may, for example, output a positive electrical signal under a +Z shock and negative electrical signal under a −Z shock. In response to receiving the voltage output, processor or controller 212 identifies a shock direction (e.g., +/−Z) and a shock voltage magnitude from the voltage output. Further, the processor 212 multiplies the shock voltage magnitude (over time) by a constant determined by a maximum voltage output of either the first voltage amplifier circuit 206 or the second voltage amplifier circuit 208. It should be noted that, in some embodiments, the maximum voltage output of the first voltage amplifier circuit 206 and the maximum voltage output of the second voltage amplifier circuit 208 may be the same. In other embodiments, the maximum voltage output of the first voltage amplifier circuit 206 may be different from the maximum voltage output of the second voltage amplifier circuit 208.

In the embodiment of FIG. 2A, it is assumed that the magnitude of the maximum voltage outputs of both amplifiers 206 and 208 are the same. Processor or controller 212 sends a product value obtained by multiplying the shock voltage magnitude by the constant to the first voltage amplifier circuit 206 and the second voltage amplifier circuit 208. The first voltage amplifier circuit 206 and the second voltage amplifier circuit 208 employ the product value as a real-time gain factor. Based on the gain factor, the first voltage amplifier circuit 206 amplifies the input voltage to a first voltage output, which is provided to the first piezoelectric layer 202 as the first deflection control signal. Similarly, based on the gain factor, the first voltage amplifier circuit 208 amplifies the voltage amplifier input voltage to a second voltage output that is provided to the second piezoelectric layer 204 as the second deflection control signal.

In the embodiment of FIG. 2A, in response to receiving respective first and second deflection control signals, the piezoelectric layers 202 and 204 are deflected such that they apply substantially equivalent force to base 256 and/or cover 252. This prevents excessive deflection of base 256 and/or cover 252 and provides a substantial gap between base 256 and cover 252, thereby improving shock performance of the data storage drive 200A.

Figure 2B:
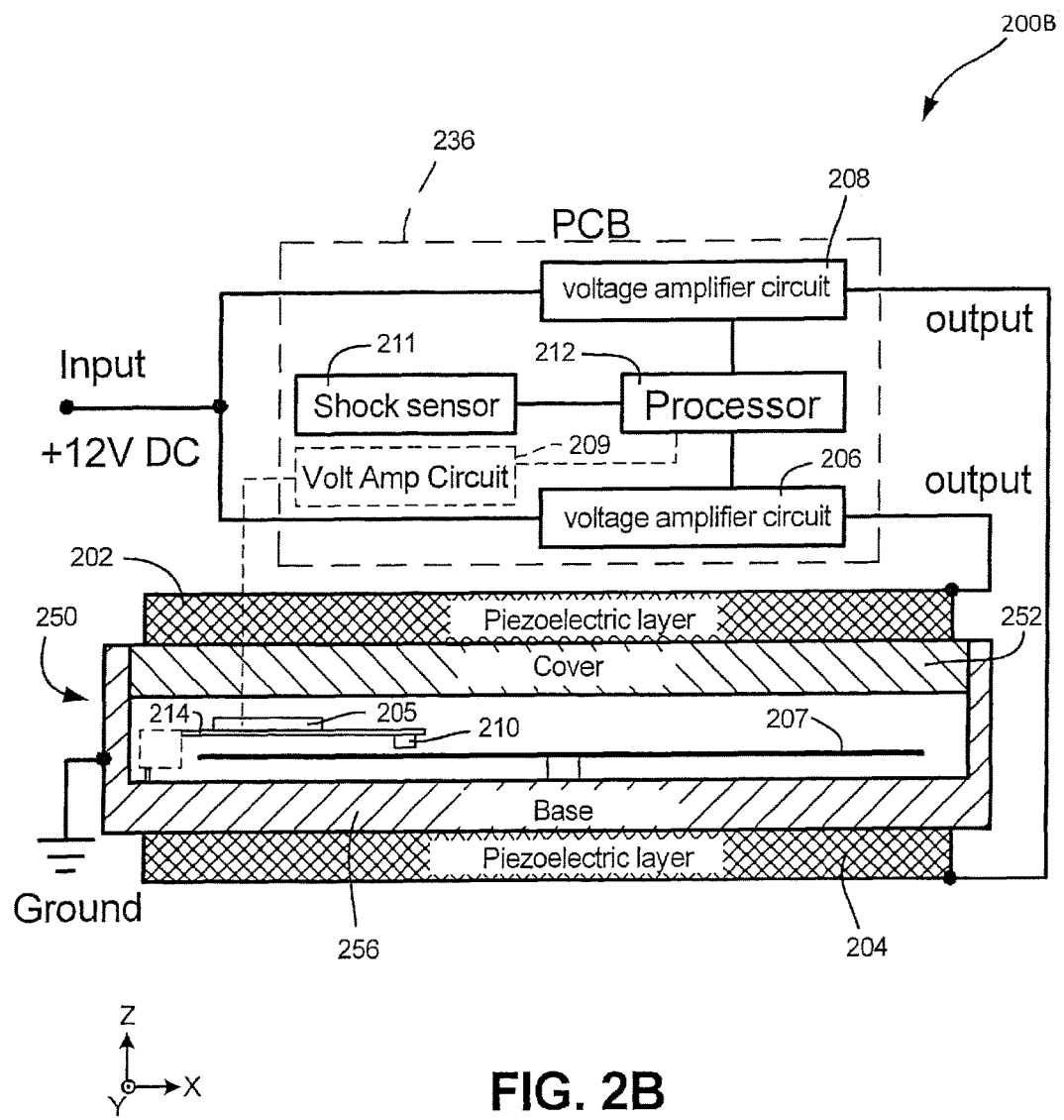
FIG. 2B is a diagrammatic illustration of a data storage device in accordance with another embodiment.

FIG. 2B is a diagrammatic illustration of a data storage device 200B that includes an anti-shock system in accordance with another embodiment. Data storage device 200B is substantially similar to data storage device 200A (of FIG. 2A) and therefore a description of the similar elements is not repeated in connection with FIG. 2B. The anti-shock system of FIG. 2B is also substantially similar to the anti-shock system of FIG. 2A. However, the anti-shock system of FIG. 2B further includes a third piezoelectric material layer 205 and a third voltage amplifier circuit 209. The third piezoelectric layer 205 is affixed/bonded to arm 214, which supports slider 210. Third voltage amplifier circuit 209 is coupled to processor 212 and to piezoelectric layer 205. A surface of third piezoelectric layer 205 that is in contact with arm 214 is grounded via base 256 because arm 214 is connected to base 256 through electrically conductive components. Deflection control of piezoelectric layer 205 is carried out in a manner similar to the deflection control of piezoelectric layer 202 and 204. By controlling a deflection of piezoelectric layer 205 during shock events, collision between head 210 and disc 207 may be prevented.

Figure 3A:
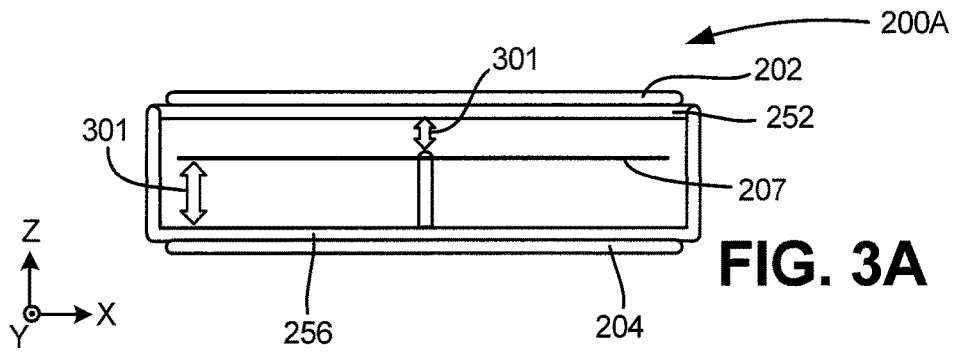
FIGS. 3A, 3B and 3C are block diagrams that together illustrate how an anti-shock system of FIG. 2A operates to control distortion of device components during a shock applied to the device in a first direction.
Figure 3B:
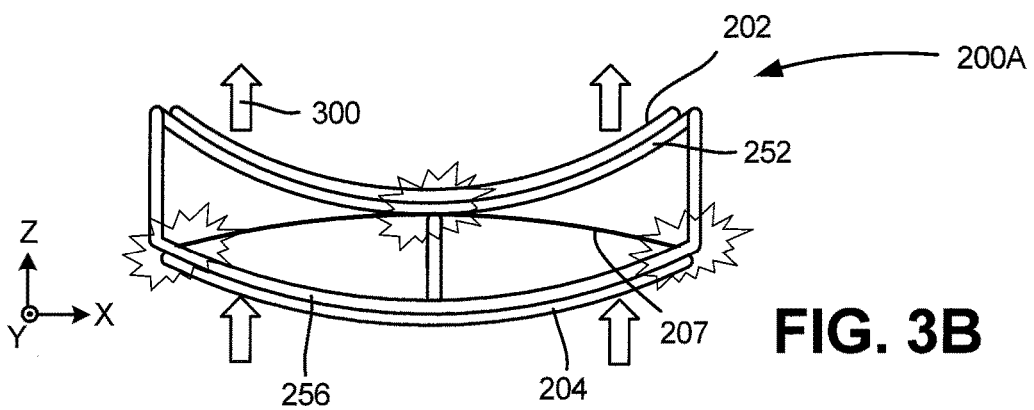
Figure 3C:
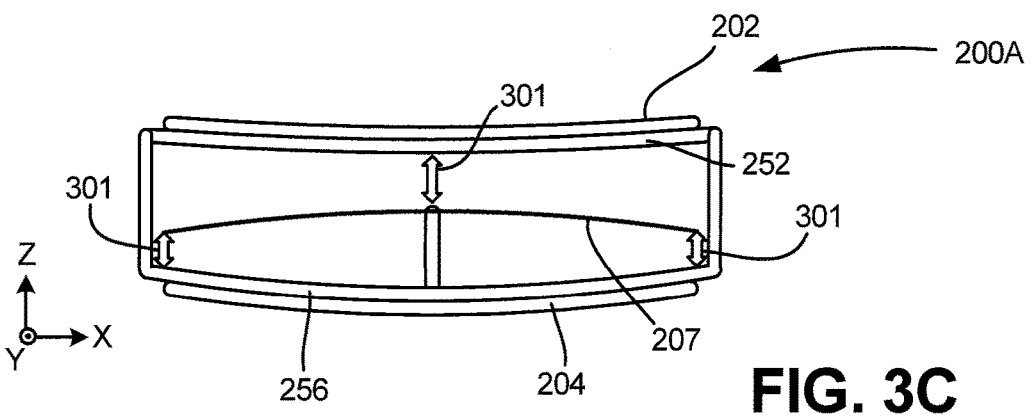

FIGS. 3A, 3B and 3C are block diagrams that together illustrate how an anti-shock system of FIG. 2A operates to control distortion of device components during a shock applied to the device 200A in a first direction. FIG. 3A shows an original state of device 200A (e.g., a state when no shock is applied to device 200A). Two-headed arrows 301 are used to represent space between internal components of drive 200A and portions of the housing (e.g., cover 252 and base 256). As described earlier, a disc such as 207 is supported by a motor between cover 252 and base 256. FIG. 3B shows that under shock in a +Z direction (denoted by reference numeral 300), cover 252, base 256 and an edge of disc 207 will bend in a −Z direction. Due to the nature of the deflection, the gap between the disc edge and the base 256, and the gap between the disc center and the cover 252 will decrease and therefore contact may occur. As described earlier in connection with FIG. 2A, during the shock event, an active control voltage (e.g., a deflection control voltage) is applied to the piezoelectric layers 202 and 204. In response to receiving the deflection control voltage, actuating forces are produced in the piezoelectric layers 202 and 204. The actuating forces push the base 256 and the cover 252 towards their original positions (e.g., positions before the shock was applied), thereby preventing deflection. The control target is to force base 256 and cover 252 to their un-deformed shapes as shown in FIG. 3A.

Figure 4A:
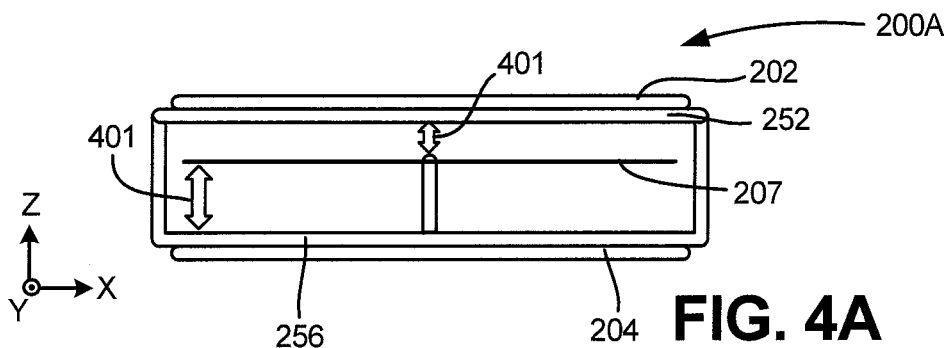
FIGS. 4A, 4B and 4C are block diagrams that together illustrate how an anti-shock system of FIG. 2A operates to control distortion of device components during a shock applied to the device in a second direction.
Figure 4B:
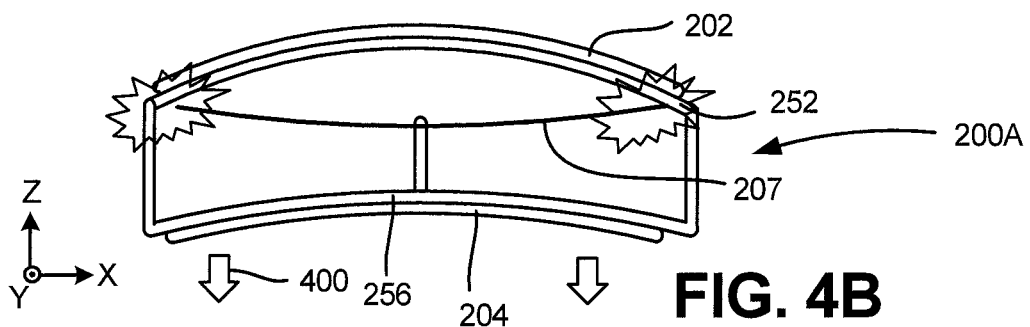
Figure 4C:
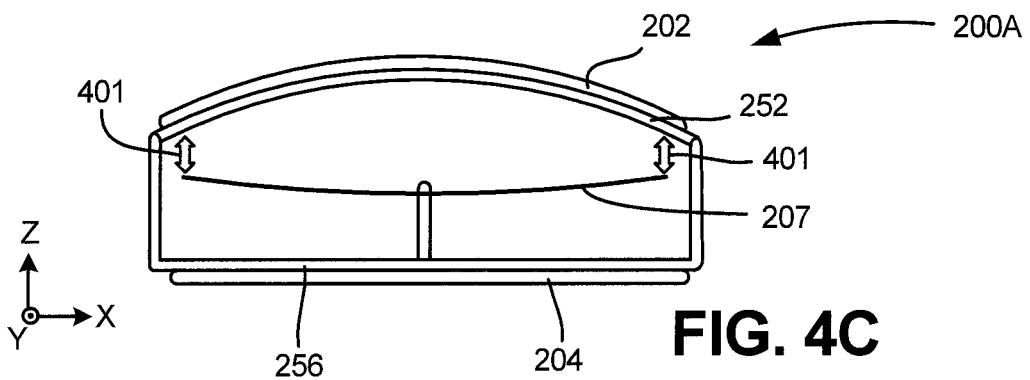

FIGS. 4A, 4B and 4C are block diagrams that together illustrate how an anti-shock system of FIG. 2A operates to control distortion of device components during a shock applied to the device 200A in a second direction. FIG. 4A shows an original state of device 200A (e.g., a state when no shock is applied to device 200A). Two-headed arrows 401 are used to represent space between internal components of drive 200A and portions of the housing (e.g., cover 252 and base 256). FIG. 4B shows that under shock in a −Z direction (denoted by reference numeral 400), cover 252, base 256 and an edge of disc 207 will bend in a +Z direction. Due to the nature of the deflection, the gap between disc edge and cover 252 will decrease because of disc and base 256 deflections. The gap between the disc center and the cover 252 increases. Therefore, controlling cover 252 deflection is not necessary. Accordingly, in this case, a control voltage (e.g., a deflection control voltage) may only be applied to the piezoelectric layer (e.g., piezoelectric layer 204) bonded to the base 256. The resulting actuating force in the piezoelectric layer 204 will push base 256 back to the un-deformed shape, which increases the gap between the disc edge and cover 252 as shown in FIG. 4C, there preventing contact of the type shown in FIG. 4B.

Figure 5A:
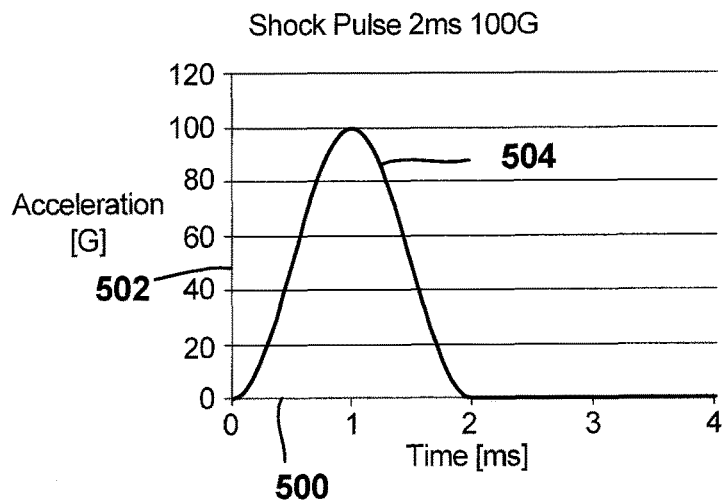
FIG. 5A is a graph illustrating a shock pulse applied to a data storage device.
Figure 5B:
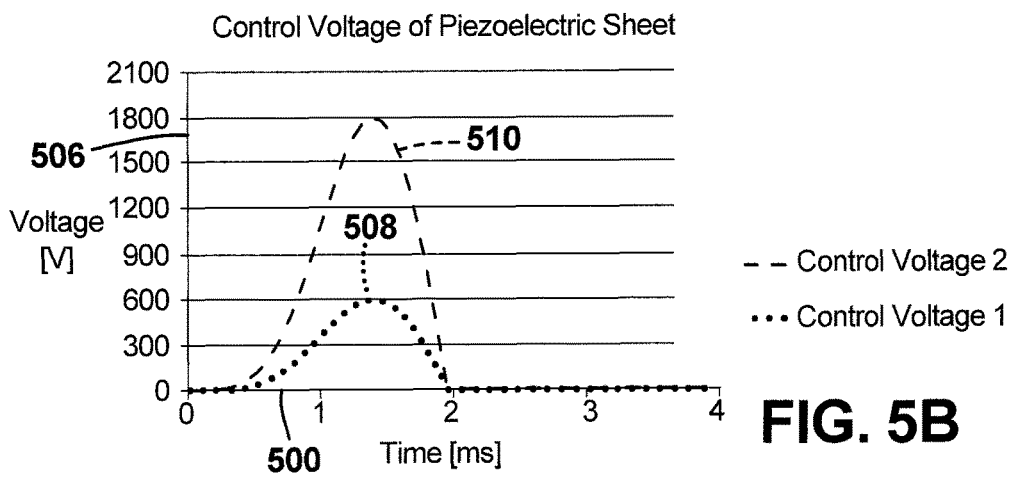
FIG. 5B is a graph illustrating control voltages generated by an anti-shock system in response to the shock pulse of 5A.
Figure 5C:
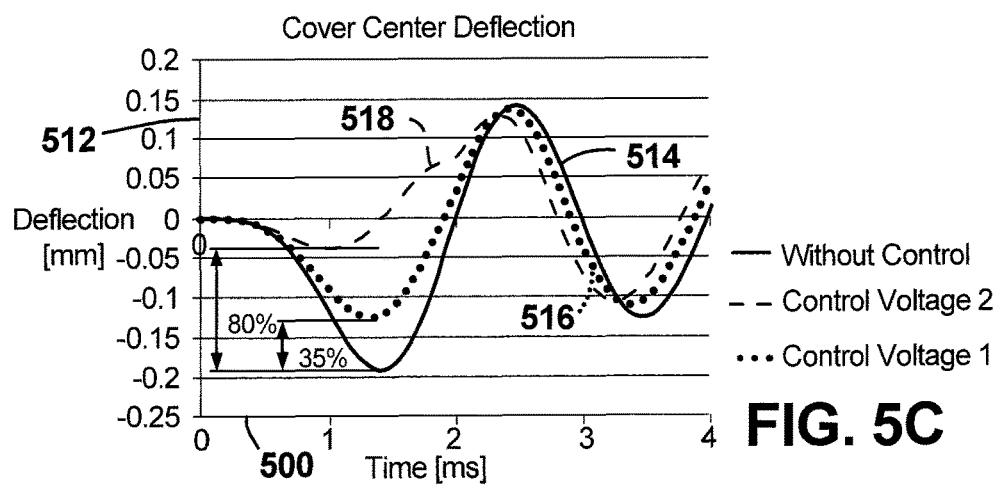
FIG. 5C is a graph illustrating a comparison between deflection of a cover of a data storage device when control voltages of the type shown in FIG. 5B are employed and when no control voltages are employed.

FIGS. 5A, 5B and 5C are graphs illustrating a shock pulse applied to a data storage device and deflection control by the anti-shock system in response to the applied shock pulse. The data storage device used for the experiment includes a single piezoelectric layer bonded to an inner/bottom surface of a cover (such as 252 of FIGS. 2A and 2B) of the data storage device. The piezoelectric layer is a sheet that is circular in shape with a 20 millimeter (mm) diameter and a thickness of 0.05 mm, which is suitable for small form-factor data storage devices. In FIGS. 5A, 5B and 5C, horizontal axis 500 represents time in milliseconds (ms). In FIG. 5A, vertical axis 502 represents acceleration measured in terms of acceleration due to gravity (G). In FIG. 5B, vertical axis 506 represents voltage in Volts (V). In FIG. 5C, vertical axis 512 represents deflection in millimeters (mm).

FIG. 5A shows a shock pulse 504 applied to the date storage device over a period of 2 ms. The 100 G shock pulse 504 is applied in a +Z direction to check the effectiveness of the active piezoelectric anti-shock system of the data storage device.

By linearly amplifying the voltage output of the shock sensor (such as 211 of FIGS. 2A and 2B), the voltage amplifier circuit (such as 206, 208 of FIGS. 2A and 2B) outputs control voltage 1 (denoted by reference numeral 508 in FIG. 5B), which is applied to the piezoelectric sheet. This control voltage is transferred as an actuating force by the piezoelectric sheet to prevent cover deflection. As a result, cover deflection at a first peak (shown in plot 514 of FIG. 5C), which may cause contact, is reduced by 35% as shown by plot 516 in FIG. 5C. By increasing the control voltage by 2 times as shown in control voltage 2 (plot 510 in FIG. 5B), the reduction in deflection of the cover increase to 80% as shown in plot 518 of FIG. 5C.

Figure 6:
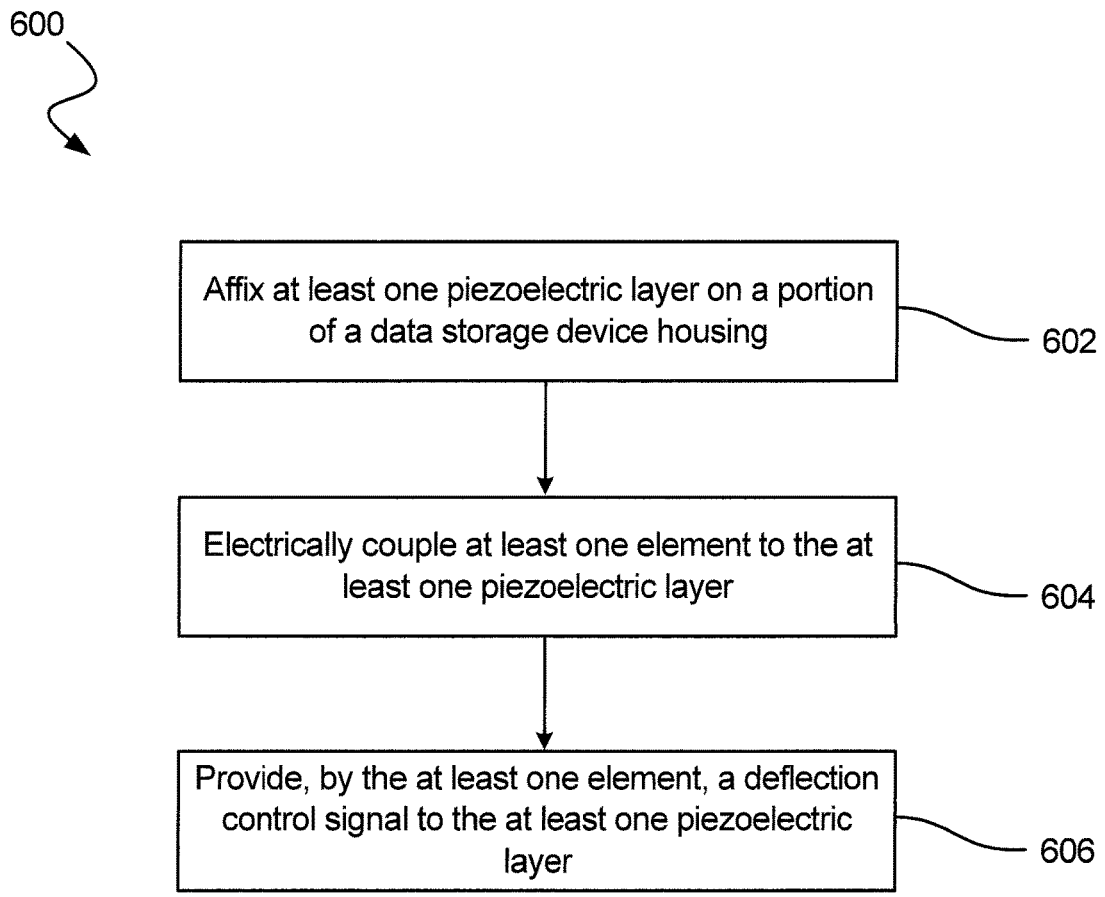
FIG. 6 is a flow diagram of a method embodiment.

FIG. 6 is a flow diagram 600 of a method embodiment. As step 602, at least one piezoelectric layer is affixed on a portion of a data storage device housing. At step 604, at least one element is electrically coupled to the at least one piezoelectric layer. At step 606, the at least one element provides a deflection control signal to the at least one piezoelectric layer.

Figure 7:
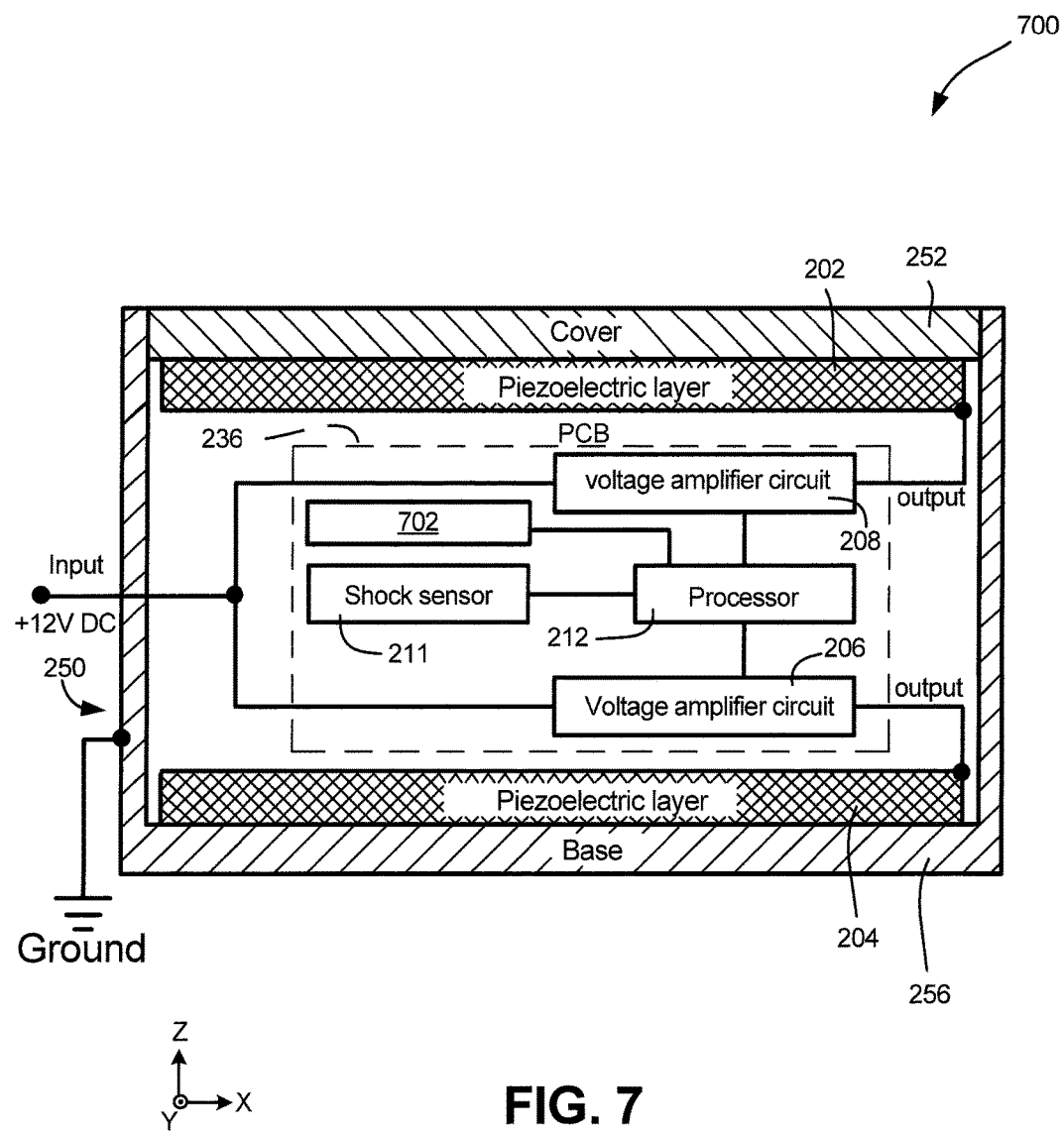
FIG. 7 is a diagrammatic illustration of a data storage device in accordance with yet another embodiment.

Anti-shock system embodiments are described above in connection with disc drives. However, such embodiments may also be suitable for other devices such as hybrid drives and solid state drives. FIG. 7 shows the anti-shock system embodiment of FIG. 2A included in a solid state drive (SSD) 700. In SSD 700, storage media include solid state memory (e.g. Flash memory) 702 instead of disc(s) 207 (of FIG. 2A). In SSD 700, the solid state memory chip(s) 702 are mounted on PCB 236 along with processor 212 and other circuitry. Therefore, PCB 236 is included within housing 250. Also, piezoelectric layers 202 and 204 may be positioned within the housing 250. Anti-shock operations in SSD 700 are carried out in a manner described above in connection with FIG. 2A and therefore a description of the operations is not repeated in the interest of brevity.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular embodiment or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments include more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A data storage device comprising:
   a housing;
   at least one data storage medium within the housing; and
   an anti-shock system comprising:
      at least one piezoelectric layer on a portion of the housing; and
      at least one electrical circuit coupled to the at least one piezoelectric layer, the at least one electrical circuit is configured to, in response to an external shock event, provide a deflection control signal to the at least one piezoelectric layer, the deflection control signal having a magnitude that is dependent on a direction of a force applied to the data storage device by the external shock event.

2. The data storage device of claim 1 and wherein the housing comprises a top cover and a base, and wherein the at least one piezoelectric layer comprises a first piezoelectric layer on the top cover and a second piezoelectric layer on the base.

3. The data storage device of claim 2 and wherein the at least one electrical circuit configured to provide the deflection control signal comprises:
 a first electrical circuit coupled to the first piezoelectric layer and configured to provide a first deflection control signal to the first piezoelectric layer; and
 a second electrical circuit coupled to the second piezoelectric layer and configured to provide a second deflection control signal to the second piezoelectric layer.

4. The data storage device of claim 3 and wherein the first electrical circuit comprises a first voltage amplifier circuit and the second electrical circuit comprises a second voltage amplifier circuit.

5. The data storage device of claim 4 and further comprising:
 a shock sensor; and
 a controller coupled to:
  the shock sensor;
  the first voltage amplifier circuit; and
  the second voltage amplifier circuit.

6. The data storage device of claim 5 and wherein the shock sensor is configured to sense the external shock event and configured to provide an output to the controller.

7. The data storage device of claim 6 and wherein the output provided by the shock sensor to the controller is a voltage output.

8. The data storage device of claim 7 and wherein the controller is configured to identify the direction of the force applied to the data storage device by the external shock event and a shock voltage magnitude from the voltage output.

9. The data storage device of claim 8 and wherein the controller is further configured to multiply the shock voltage magnitude by a constant determined by a maximum voltage output of either the first voltage amplifier circuit or the second voltage amplifier circuit.

10. The data storage device of claim 9 and wherein the controller is further configured to send a product value obtained by multiplying the shock voltage magnitude by the constant to the first voltage amplifier circuit and the second voltage amplifier circuit, and wherein the first voltage amplifier circuit and the second voltage amplifier circuit employ the product value as a real-time gain factor.

11. The data storage device of claim 10 and wherein:
 the first voltage amplifier circuit is configured to, based on the gain factor, amplify a voltage amplifier input voltage to a first voltage output that is provided to the first piezoelectric layer as the first deflection control signal; and
 the second voltage amplifier circuit is configured to, based on the gain factor, amplify the voltage amplifier input voltage to a second voltage output that is provided to the second piezoelectric layer as the second deflection control signal.

12. A device comprising:
 a housing;
 at least one data storage medium within the housing;
 a head that communicates with the at least one data storage medium;
 an arm that is coupled to the head; and
 an anti-shock system comprising:
  a first piezoelectric layer on a portion of the housing; and
  at least one electrical circuit coupled to the first piezoelectric layer, the at least one electrical circuit is configured to, in response to an external shock event, provide a first deflection control signal to the first piezoelectric layer, the first deflection control signal having a magnitude that is dependent on a direction of a force applied to the data storage device by the external shock event.

13. The device of claim 12 and wherein the housing comprises a top cover and a base, and wherein the first piezoelectric layer is on the top cover, and wherein the device further comprises a second piezoelectric layer on the base and a third piezoelectric layer on the arm.

14. The device of claim 13 and further comprising:
 a second electrical circuit coupled to the second piezoelectric layer and configured to provide a second deflection control signal to the second piezoelectric layer; and
 a third electrical circuit coupled to the third piezoelectric layer and configured to provide a third deflection control signal to the third piezoelectric layer.

15. The device of claim 14 and wherein the first electrical circuit comprises a first voltage amplifier circuit, the second electrical circuit comprises a second voltage amplifier circuit and the third electrical circuit comprises a third voltage amplifier circuit.

16. The device of claim 15 and further comprising:
 a shock sensor; and
 a controller coupled to:
  the shock sensor;
  the first voltage amplifier circuit;
  the second voltage amplifier circuit; and
  the third voltage amplifier circuit.

17. A method of shock-protecting a data storage device having a housing and at least one data storage medium within the housing, the method comprising:
 affixing at least one piezoelectric layer on a portion of the housing;
 electrically coupling at least one element to the at least one piezoelectric layer; and
 in response to an external shock event, providing, by the at least one element, a deflection control signal to the at least one piezoelectric layer, the deflection control signal having a magnitude that is dependent on a direction of a force applied to the data storage device by the external shock event.

18. The method of claim 17 and wherein affixing at least one piezoelectric layer on the portion of the housing comprises affixing a first piezoelectric layer to a top cover of the housing and affixing a second piezoelectric layer to a base of the housing.

19. The method of claim 18 and wherein electrically coupling the at least one element to the at least one piezoelectric layer comprises:
 electrically coupling a first element to the first piezoelectric layer to provide a first deflection control signal to the first piezoelectric layer; and electrically coupling a second element to the second piezoelectric layer to provide a second deflection control signal to the second piezoelectric layer.

20. The method of claim 19 and further comprising:

affixing a third piezoelectric layer on an arm within the data storage device, wherein the arm is coupled to a head that communicates with the data storage medium; and electrically coupling a third element the third piezoelectric layer to provide a third deflection control signal to the third piezoelectric layer.

* * * * *